Oct. 20, 1970 T. H. BRUMAGIN ET AL 3,534,910

METHOD FOR TREATING DROSS

Original Filed April 13, 1965 2 Sheets-Sheet 1

INVENTOR.
Thomas H. Brumagin
BY Stanley H. Brown
J. D. Douglas
Their atty.

INVENTOR.
Thomas H. Brumagin
Stanley H. Brown
J. D. Douglass
Their atty

United States Patent Office 3,534,910
Patented Oct. 20, 1970

3,534,910
METHOD FOR TREATING DROSS

Thomas H. Brumagin, Westfield, N.Y., and Stanley H. Brown, Newark, Ohio, assignors to Ajax-Newark, Inc., Westfield, N.Y., a corporation of New York

Original application Apr. 13, 1965, Ser. No. 447,725, now Patent No. 3,417,930, dated Dec. 24, 1968. Divided and this application May 29, 1968, Ser. No. 763,438
Int. Cl. B02c *11/08*
U.S. Cl. 241—23 5 Claims

ABSTRACT OF THE DISCLOSURE

Method of treating aluminum dross by comminuting and cooling the dross while it is on a vibrating conveyor.

This is a division of application Ser. No. 447,725, filed Apr. 13, 1965, now Pat. No. 3,417,930.

This invention relates to improvements in methods and apparatus for treating the residue from the refinement of metals and more particularly the treatment of the dross from such metals as aluminum.

As is well known to those versed in the art, when certain metals are refined, or melted, there is a scum (commonly called "dross") that forms on the top of the metal. This dross consists of certain impurities that separate from the metal but which are largely oxides of the metal itself; if the metal is aluminum such scum is mostly aluminum oxide. This material must be removed so that it does not form inclusions in the metal, and once removed becomes a disposal problem. The dross is present, particularly in aluminum, in the original recovery process, in the melting of aluminum pig and/or scrap, or, in the alloying and refining processes. It forms on top of the metal in the place where it is being melted in the furnace or the melting pot. It is common practice to skim the dross off the molten metal, place it in a tote box and then cart it to a place of storage or ultimate disposal.

One of the primary problems in the handling of dross is the fact that it is exothermic and consequently after removal an exothermic reaction takes place which continues for long periods of time until the components which cause the exothermic reaction are consumed. This makes it difficult and frequently extremely dangerous to handle and requires that the material be allowed to set for hours before it can ultimately be disposed of.

During the melting process there is also a considerable amount of the metal entrapped in the dross and this is raked off with the removal of the dross. The exothermic reaction causes this metal to be converted to oxides which results in a loss of the metal.

The resultant product is in the form of a slag, frequently in large lumps which are extremely difficult to disintegrate. This further complicates the disposal.

In some instances it has been proposed to place the dross in a rotating container and allow, or even promote the exothermic reaction to cause a coalescing of the metallic aluminum which is drained off, as in Pat. 2,481,591. This causes a loss of the desired metal. After the usable metal is removed the remaining metal is discharged and it cools in the form of lumps that are still difficult to handle.

Another device, as disclosed in Pat. 1,615,009, places the dross in an inclined conveyor where it is conveyed upward by a screw and angular propeller blades. The blades are supposed to cause the molten metal to be separated from the dross, which metal flows down and out the bottom and the dross discharged at the top. The dross is still of such character that it agglomerates and there is therefore still the problem of disposal.

In the above patents the principal object was the recovery of the aluminum metal and not the treatment of the dross to make it ultimately easier to handle.

The present invention is concerned with the treatment of the dross, to cool it and disintegrate the lumps at the same time. The combination of the two causes the cooling to proceed at a rapid rate and prevent the wasting of the metal ordinarily consumed by the exothermic reaction. The disintegration or comminution of the metal puts it in a condition for further treatment for the efficient removal of the free metal and for the disposal of the residue. The material, at the end of the process, is in a highly finely divided state which enables the further processes to be carried out without any further crushing apparatus.

Still other advantages of the invention and the invention itself will become more apparent from the following description of one form of apparatus wherein the method may be carried out.

Figure 1:
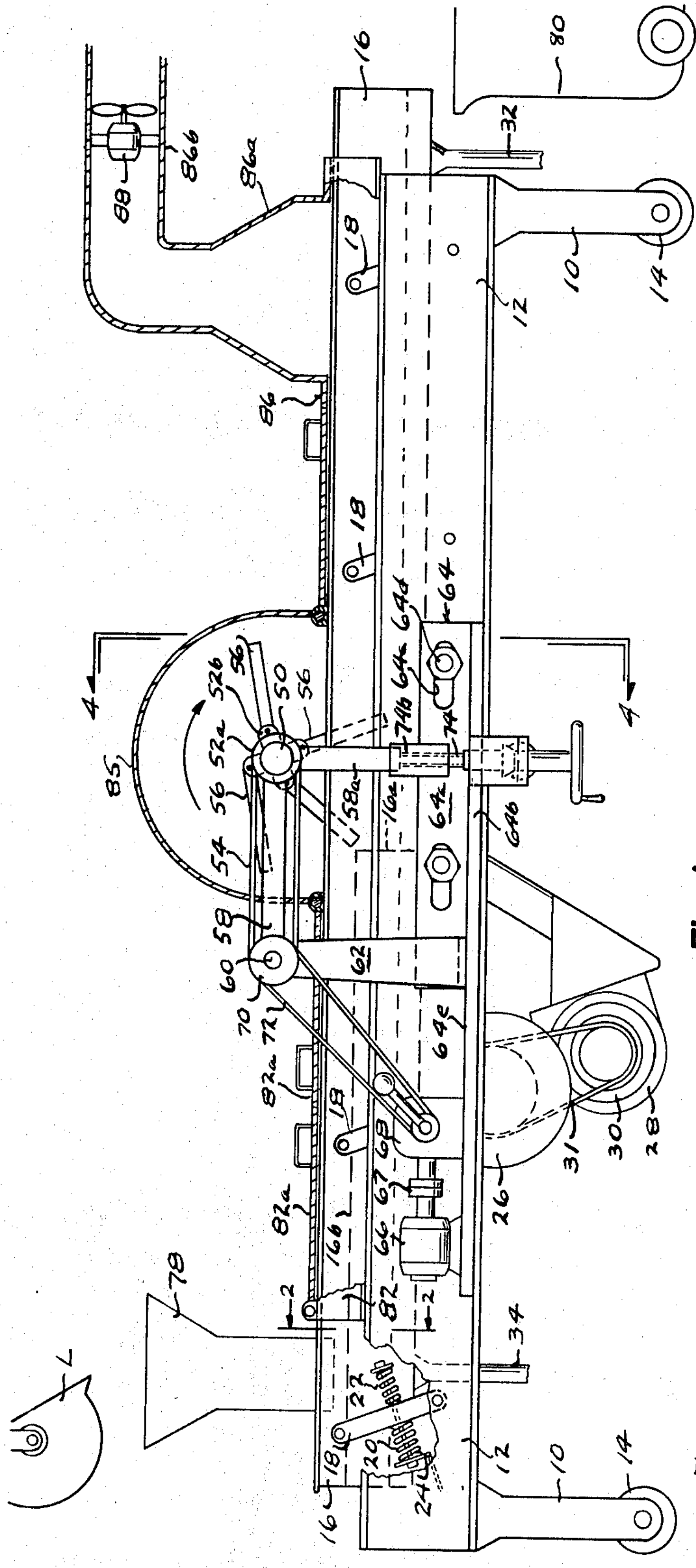
FIG. 1 is a side elevational view of an apparatus for carrying out the invention.

Briefly, the invention contemplates loading the hot dross onto a cooling conveyor and carrying it into contact with a breaker which breaks the lumps into small particles whereby the cooling is accelerated. More specifically the conveyor is preferably of the type as shown in the Brumagin Pat. 2,678,720 of May 18, 1954 and Pat. 2,901,110 of Aug. 25, 1959, and is water-cooled. The breaker is a flail type of breaker, the arms of which act in opposition to the flow of the material. In addition the conveyor may have an abutment which minimizes the flail arms knocking the chunks backward too far on the conveyor. In addition some particles may be knocked against the abutment, thus facilitating the disintegration.

In the drawings the showing is largely diagrammatic and is for the purpose of illustrating one form that the invention may take, which is the preferred form. The apparatus for conveying the material illustrated is substantially the same as that illustrated in Pat. 2,901,110 except that in this instance the upper perforated pan has been eliminated and legs or pedestals are shown for supporting the main frame. For a more detailed understanding of the construction reference may be had to said patent. For the purpose of this invention only the salient feature will be pointed out, including modifications of the conveyor pan.

As shown in FIG. 1, the base includes a plurality of pedestals 10 which support at their upper end a main frame 12. The lower ends of the pedestals may be provided with wheels 14 whereby the device may be made mobile. In the more permanent installations the wheels are omitted. A conveyor pan 16 is supported from the frame 12 by the supports 18 which have the spring 20–22 connected between the supports and the abutments 24 in the main frame 12. A mechanical vibrator of the rotary unbalanced type 26 is connected to the conveyor pan 16 and driven by a motor 28 through a variable speed drive 30 supported on the main frame, through a belt 31. The details of the above construction are shown in the above-mentioned patents.

With the above construction the conveyor pan, when the motor is energized, partakes of a movement in an upward and forward direction, which is to the right as viewed in the figure, followed by a return movement in a downward and backward direction. The material disposed on the pan is conveyed from the left to the right, as viewed in the figure.

Although the structure shown contemplates the vibrator being connected to the pan under the pan, suitable vibrating mechanism could be connected to the end of the pan, as shown in Pat. No. 2,678,720, of May 18, 1954.

In either event, the material on the pan partakes of a movement as described above which causes a jumping conveying movement of the material on the pan from the left to the right end. The violence of this movement, and hence the conveying speed, is controlled by the speed of vibration which in turn is controlled by the variable speed drive transmission.

At this point attention is drawn to the fact that there are two variations from the pan shown in the previous patents, the one being that the pan is cooled by water and the other that the conveying surface of the pan is not a single plane horizontal surface but has a step or abutment in its midsection which cooperates with a flail later described in detail.

Figure 2:
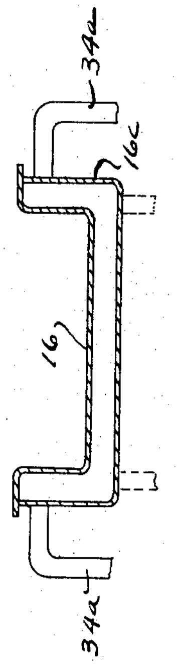
FIG. 2 is a section through the conveyor element.

The cooling is effected by providing the pan 16 with a water jacket 16*c*, FIG. 2, which extends the length of the sides and bottom of the pan in spaced relation thereto. Cooling fluid, such as water, is admitted at one end through a flexible hose 32 at one end and removed through a similar flexible hose 34 at the other end. In the interest of saving water, the water may be circulated by a suitable pump 36 through a heat exchanger 38, FIG. 3, to provide the desired cooling of the water which is circulated through the water jacket. In certain locations it may be desirable to provide a heat exchanger that is refrigerated to cool the water and increase the efficiency.

Figure 3:
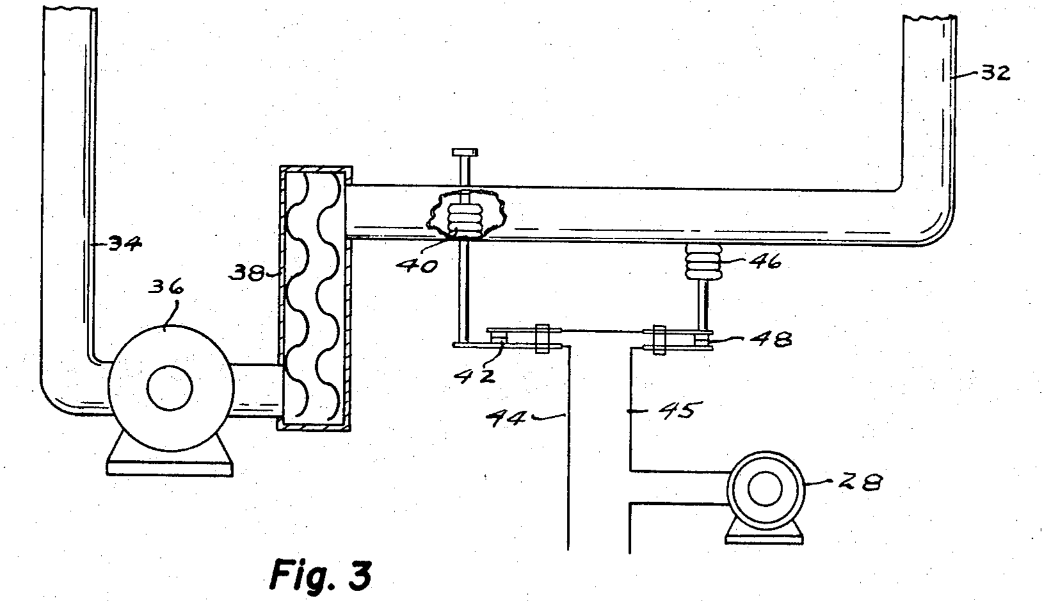
FIG. 3 is a schematic view of a safety control and cooling system.
Figure 4:
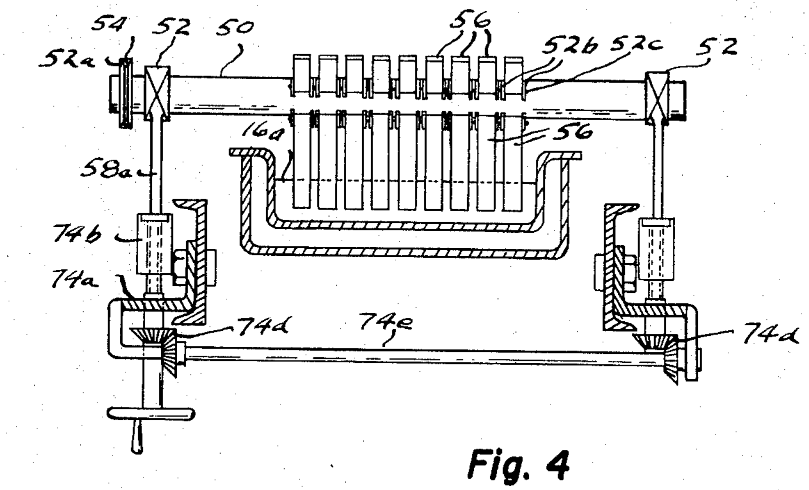
FIG. 4 is a section on the line 4—4 of FIG. 1.

It is also contemplated that suitable control means be provided in the cooling system to indicate the temperature of the water and to interrupt the operation of the motor should the water reach too high a degree of temperature. In FIG. 3 this is shown as being a bellows controlled thermostat with the adjustable bellows 40 disposed in the water line and operating a pair of switch contacts 42 disposed in the power line 44 connected to the motor 28. In addition, a pressure sensitive bellows 46 connected in the water line and having a rod connected to a switch 48 in the power line 45 may be used to shut off the motor if the pressure drops below a certain pressure.

It is pointed out that the water to the conveyor may be supplied at more than one point, such as indicated at 34*a*, FIG. 2, to provide a substantially uniform temperature throughout the length of the conveyor but that it is preferred that it be fed to the exit end of the conveyer, whereby the cooling is progressively greater from the entrance end toward the exit.

As previously mentioned, the conveyer is preferably provided with a step or abutment. This is shown at 16*a* in FIG. 1 in dotted lines and is formed by providing a raised portion 16*b* spaced above the other bottom portion of the conveyor pan and extending from the loading end toward the midsection. This portion of the bottom 16*b* may be parallel to the remainder of the pan or it may start at a lower level at the loading end and extend upward.

Means is provided, disposed in the path of flow of the dross on the pan, to strike the lumps of dross as they fall off the false bottom, at the step 16*a*, severe blows to cause it to further disintegrate. In the drawings this is shown as a flail which comprises a motor drive shaft having a plurality of arms pivoted on its periphery and rotated in a direction opposite to the path of travel of the dross so that the arms strike the dross and break it up into small particles. In this operation the disintegration is increased by the fact that the larger particles or lumps are knocked back against the step abutment 16*a*.

The flail is adjustable as to height above the pan 16 and as to it sproximity to the abutment 16*a*. It is also mounted in such a manner that it can automatically rise away from the pan without damage, should something unbreakable be placed on the pan.

In the drawings a simplified construction is depicted. It will be appreciated that the drawings are for the purpose of disclosing one means for obtaining the results and that other structures could be used.

The flail structure is supported from the base frame and includes a shaft 50 mounted in journals 52 and rotated by a driven belt 54 extending around a pulley 52*a*. It extends transversely relative to the pan 16 and spaced from the abutment 16*a*. A plurality of flail arms 56 are pivotally secured to the periphery of the shaft. The mounting for the arms is illustrated as being lugs 52*b* extending outwardly from the shaft and pins 52*c* ertending through the lugs and the ends of the arms. In its preferred form there are four sets of these arms and each set is disposed in a row lengthwise of the shaft 50. It is apparent that there could be only one or more rows of the arms. The diameter of the shaft 50 should be large enough to allow for the mounting of the arms and small enough that it does not interfere with the free swinging movement of the arms. The arms themselves should be of heavy stock, such that their impact against the dross is of a substantial nature and such that their weight and velocity causes the lumps to be knocked against the abutment 16*a*.

As best shown in FIG. 1, the shaft 50 is supported on the outer ends between the outer ends a pair of arms 58 pivotally journalled on a shaft 60 which in turn is supported by a pair of stanchions 62. The stanchions 62 are mounted on base brackets 64 each of which includes a vertically extending part 64*a* and a base part 64*b*. The brackets are disposed on opposite sides of the main frame 12. The vertical part of each bracket is provided with slots 64*c* through which bolts 64*d* extend, thus enabling the brackets to be adjusted longitudinally on the main frame 12 and to move the longitudinal position of the flail relative to the abutment 16*a*. One of the brackets is provided with a horizontal extension part 64*e* which provides a base on which a motor 66 and variable speed transmission 68 are mounted. They are connected by a coupling 67. The variable speed transmission is belted to one of the sheaves of a double sheave 70 by a belt 72. Thus, the flail may be adjustable as to its spacing from the abutment 62*a*.

The flail shaft and its arms may also swing in an arc about the shaft 60 by virtue of the pivoted supporting arms 58. The height of the flail arms from the bottom of the pan 16 is adjusted by a screw 74 which is supported by a bracket 74*a* on the bracket 64 and engages in a threaded sleeve 74*b* which is in interlocking engagement with a downwardly extending arm 58*a* which is integral with the arm 58. Preferably there should be one of the adjustments on each side of the main frame to enable the flail height to be adjusted on both ends. The screws 74 on opposite sides are connected together by bevel gears 74*d* and a shaft 74*e* so that both ends of the flail may be adjusted from one side of the main frame.

Thus it is apparent that means is provided for adjusting the height of the flail as well as its proximity to the abutment 16*a*.

In addition, the speed of the flail may be adjusted to provide the desired impact of the arms against the dross. It is contemplated that the speed of movement of the dross along the conveyer be correlated with the speed of the flail to provide the desired breaking up of the dross lumps. Should a foreign object that cannot be broken be conveyed under the flail, the flail can rise by virtue of its pivotal connection, since the support arm 58*a* may move out of its interlocking connection with the screw sleeve 74*b*.

As best shown in FIG. 1, the dross from the furnace or reclamation pot may be dumped into the conveyer at the left end from a ladle L. If desired, a hopper 78 may be provided and the material passed down through to the conveyer. The dross lands on the sub-floor 16*b* of the conveyer pan which is being vibrated by the vibrator

26. Due to the mounting, the material is advanced along the conveyer in a series of jumps. The violence of the agitation may be controlled by the speed of the vibrator 26. The material moves along the sub-floor where some preliminary separation and distribution of the material is effected.

It is pointed out that the conveying speed should also be controlled according to the degree of heat of the material. The hotter the material, the slower the speed should be. The bouncing of the material along the floor provides a preliminary cooling and disintegration. The material then passes over end of the sub-floor and drops toward the main floor. The flail is, however, operating in close proximity to the abutment 16*a* with the arms 56 swinging violently toward the abutment. Therefore, the arms strike the material with considerable force and break the material up into fine particles. The speed of the flail is such and the spacing between the flail arms is such that only the finer particles pass beyond the arms. It will be appreciated that the rows of flail arms could be so positioned that the arms in one row were offset relative to those in another row, thus preventing channeling of the material. The result is that the hot lumps are broken up and cooled, thus terminating the exothermic reaction by cooling and resultant solidification of the molten metal. The finely divided particles are then discharged from the end into a tote box 80 by which it may be conveyed to a point where the material may be further processed or safely stored. The material may be subjected to further refinement process where the metallic aluminum is recovered, or used for other purposes.

The violent shaking of the dross causes a preliminary separation of the molten aluminum which solidifies on the cooling surface of the conveyer. The subsequent beating of the dross provides a further separation of the included aluminum which is finally cooled and may be readily removed from the comminuted dross. This is particularly useful since the skimming of the dross in the melting furnace is difficult to perform without some of the molten aluminum being included therein.

It is preferred that means be provided for the elimination of the dust that is generated during the disintegration of the material. To that end, a hood 82 is provided covering the conveyer and flail and is coupled to a suction means and a suitable separator of the well known cyclone or tuyer type, where the dust is recovered and various products subsequently reclaimed.

Such a hood is shown diagrammatically in FIG. 1 and constitutes a portion covering the charging end of the conveyer and supported by the main frame 12. It may have a pair of top doors 82*a* that may be opened to obtain access to the charging end. An enlargement 85 is provided for the flail and at the discharge end the cover 86 is provided with a hood 86*a* which connects to a duct 86*b* and to the separator not shown, a suitable fan 88 may be disposed in the duct, if desired.

Having thus described the invention in an embodiment thereof, it will be apparent that numerous and extensive departures may be made from the basic disclosure without departing from the spirit or the invention as defined in the appended claims.

We claim:

1. The method of treating aluminum dross to reduce it to a finely divided state and terminate the exothermic reaction which comprises the placing the dross on a conveyer and comminuting it while on the conveyer to reduce the particle size and enhance the cooling thereof.

2. The method as described in claim 1, wherein the conveyer is cooled.

3. The method as described in claim 1, wherein the conveyer is of the vibratory type.

4. The method as described in claim 3, wherein the vibrator motion which effects the conveying is cyclically forward and upward and then downward and backward in a complementary path.

5. The method of treating aluminum dross which comprises conveying the heated dross on a cooled vibratory conveyer to provide a distribution of the dross on the conveyer and a preliminary breaking up thereof by causing the dross to jump upward and forward, striking the pieces of dross on the conveyer in a direction opposite to the conveying direction to further break up the pieces, and conveying the broken pieces along the remainder of the conveyer to provide a final cooling thereof.

References Cited

UNITED STATES PATENTS

| | | | |
|---|---|---|---|
| 2,212,482 | 8/1940 | Sheldon | 241—187 X |
| 2,609,149 | 9/1952 | Posselt | 241—65 X |
| 2,885,157 | 5/1959 | Fegely | 241—65 X |
| 2,901,110 | 8/1959 | Brumagin | 209—330 |
| 3,061,210 | 10/1962 | Schaeffer | 241—186 X |
| 3,089,653 | 5/1963 | Ostberg | 241—186 X |

FOREIGN PATENTS 240,718 9/1962 Australia.

FRANK T. YOST, Primary Examiner

U.S. Cl. X.R.

241—65